June 10, 1930.  C. E. MAYNARD  1,762,832
VALVE PAD PRESS
Filed Nov. 15, 1928
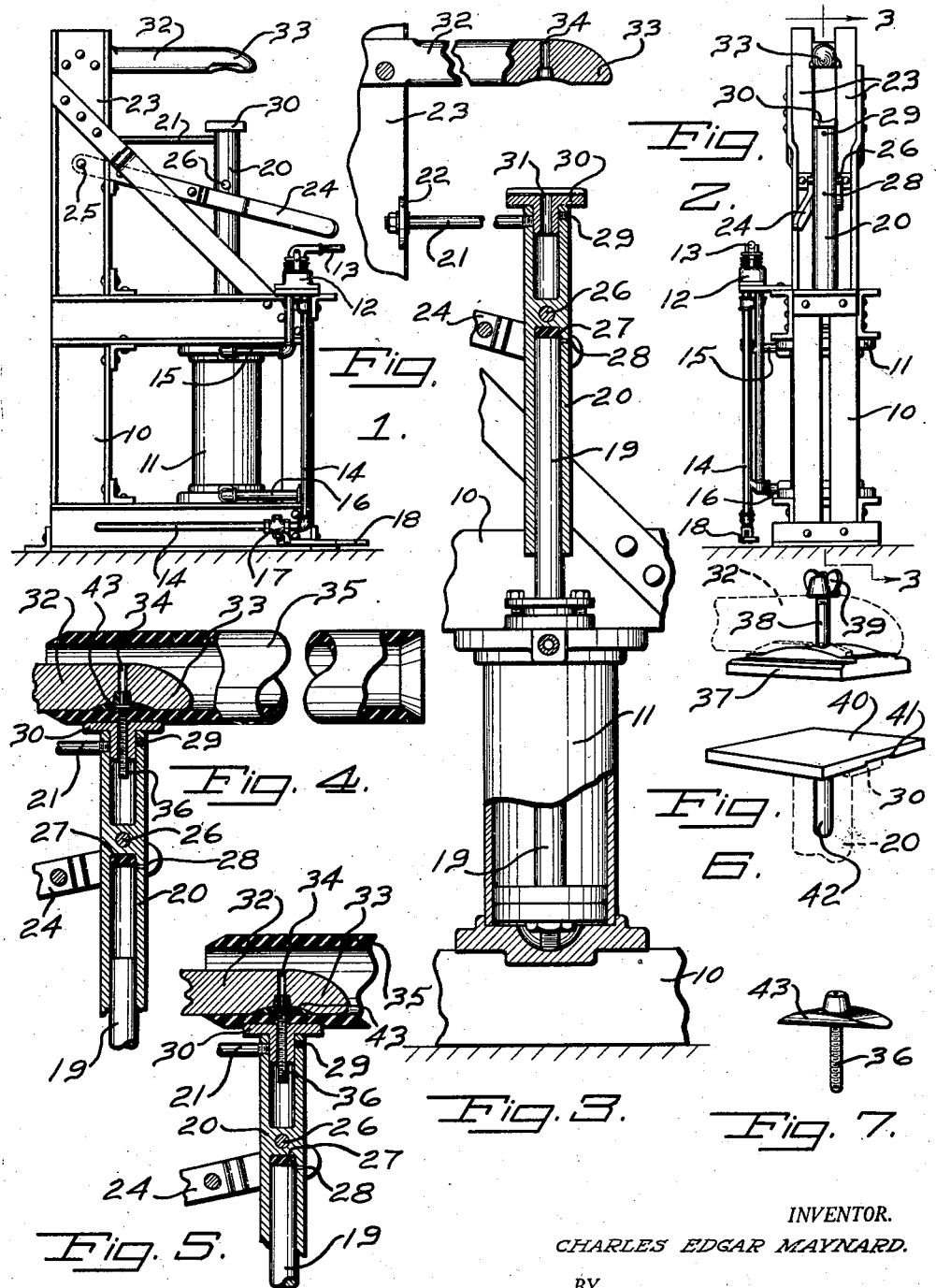
INVENTOR.
CHARLES EDGAR MAYNARD.
BY
ATTORNEY.

Patented June 10, 1930

1,762,832

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

VALVE-PAD PRESS

Application filed November 15, 1928. Serial No. 319,508.

My invention relates to presses and more particularly to a press for use in the manufacture of airbags that are used in the vulcanization of pneumatic tires and has for its object to provide a press which will perform all of the stitching operations necessary to the manufacture of an airbag. Further objects will be apparent from the following specification and claims and in the drawings which illustrate one embodiment of my invention:

Fig. 1 is a side view of my invention shown in inoperative position;

Fig. 2 is a front view of the machine shown in Fig. 1;

Fig. 3 is a sectional view taken on the line 3—3 of Fig. 2, but on a larger scale;

Figs. 4 and 5 are partial sectional views similar to Fig. 3, but showing different operating positions of the parts;

Fig. 6 is a perspective view showing attachments which may be used with the machine; and Fig. 7 is a perspective view of a valve pad for an airbag.

Referring to the drawings 10 represents a frame on which is mounted a two-way air cylinder 11 controlled by a valve 12. A handle 13 on the valve 12 may be operated to place the latter in neutral position or at either of two operating positions, one of which admits compressed air from a supply pipe 14 into a pipe 15 connected to the top of cylinder 11 and at the same time opens the bottom of the cylinder through a pipe 16 to an exhaust port in the valve 12, while the other operating position reverses the order and admits air from pipe 14 into pipe 16 and to the bottom of the cylinder while at the same time opens the top to the exhaust through pipe 15. The valve 12, as shown in Figs. 1 and 2, is of a standard commercial type the details of which are well known, hence they are not shown in the drawings. Connected in the pipe 14 is a conventional valve 17 adapted to be operated by a foot lever 18 to open and close the line 14, thus enabling the operator to control the air supply to start or stop the action of the cylinder 11 when the valve 12 is at either of its operating positions. Of course when the valve 12 is at neutral position no action takes place so that when the machine is inoperative, as shown in Figs. 1 and 2, it will not operate unless both valves are manipulated, thus providing against any operation of the machine due to an accidental manipulation of one of the valves.

The piston rod 19 of the cylinder 11 is slidably fitted in a sleeve 20 which, as shown in Fig. 3, bears a rod 21 at the end of which is mounted a freely rotatable roll 22. This roll engages between the two upright members 23 of the frame 10 so as to prevent any rotation of the sleeve 20 on the piston rod 19. A hand lever 24 pivoted to the frame 11 at 25 engages a pin 26 in the sleeve 20 so that when the lever is raised it also raises the sleeve 20. The end of the piston rod 19 engages with a rubber packing 27 in the sleeve 20 when the latter is at rest, but when the lever 24 raises the sleeve the piston rod remains stationary and to insure an easy action a hole 28 is formed in the sleeve 20 to prevent any resistance due to atmospheric pressure.

Adjustably secured at the top of the sleeve 20 by set screw 29 is a concaved platen 30 in which is a hole 31 concentric with the sleeve 20.

Mounted between the two upright members 23 of the frame 10 is an arm 32 the end 33 of which is rounded off. The underside of the arm 32 is shaped to conform to the top side of a valve pad 43, shown in Fig. 7, and a hole 34, which is in line with the hole 31 of the concaved platen 30, extends to the top of the arm 32.

One of the methods of manufacturing airbags consists of forming rubber sheets into a tube on a mandrel and then skiving the ends to produce a rubber tube 35, as shown in Fig. 4. A valve pad 43 in which is moulded a valve stem 36 is positioned on the inside of the tube so that the valve stem 36 protrudes on the outside of the rubber tube 35 through a hole previously cut in the latter (see Figs. 4 and 5). In order to properly stitch the valve pad 43 to the rubber tube 35 considerable pressure is required and my invention does this quickly and completely. The operation of the machine to attain this result is as follows.

The valve 12 is set so as to open the top cylinder connection 15 to the air supply pipe 14 and to open the bottom cylinder connection 16 to the exhaust, but no cylinder action is attained as the valve 17 is still closed. The end of a rubber tube 35, near which a valve pad 43 with its valve stem 36 has been inserted, is placed over the arm 32 and the operator raises the lever 24 to raise the concave platen 30 until the latter engages the outside of the rubber tube and presses the top of the valve pad 43 into engagement with the arm 32. The valve stem 36, as is shown in Fig. 4, extends through the hole 31 of the platen 30 and serves to position the valve pad 43 in respect to the arm 32. As is shown in Fig. 4, the piston rod remains stationary, but as soon as the foot lever 18 is pressed to open the valve 17 the cylinder operates to raise the piston rod thus applying the desired pressure, as shown in Fig. 5. As the lever 24 is below the pin 26 the shock, due to the piston rod 19 striking the rubber packing 27, is not transmitted to the operator's hand. The operator continues to press the foot lever 18 and after the stitching is complete by simply reversing the valve 12 the piston rod 19 is lowered and as soon as it has reached its lowermost position the valve 12 is brought back to neutral. The operator then releases the foot lever 18 and lowers the arm 24 to return all the parts to their starting positions.

After this operation the skived ends of the tube 35 are brought around to be spliced together and to accomplish the stitching of this splice on the machine I have provided, as shown in Fig. 6, a platen 37 formed to fit the underside of arm 32 and which is attached to the latter by a bolt 38 passing through the hole 34 of the arm 32 and held in place by a wing nut 39. Another platen 40 is provided with a groove 41 to engage the concave platen 30 and a rod 42 attached to the platen 40 fits in the hole 31 of the platen 30 to position the platen 40. The splice of the tube 35 is then inserted between the platens 37 and 40 and the operation of the machine is repeated except that this time the preliminary movement of the lower platen by lever 24 may be omitted.

Having thus described my invention, I claim:

1. A device of the character described comprising a support, a platen formed to fit a valve pad, said platen fixed to the support, a rod, means carried by the support to move the rod toward and from the platen, a sleeve slidably mounted on the rod within predetermined limits, means carried by the sleeve to hold the latter against rotation on the rod, a platen formed to fit the outside of a rubber tube fixed to the sleeve, means carried by the support to move the platen carried by the sleeve toward the platen fixed to the support, and means operable to move the rod in the sleeve to press the platens together.

2. A device of the character described comprising a platen over which the end of a tube may be telescoped, said platen being formed to receive the inner face of a valve pad positioned adjacent the end of the tube, a second platen shaped to receive the valve stem of the valve pad and to engage the outside of the tube opposite the first named platen, means to move the second platen into engagement with the tube and means to apply an impacting pressure against the second platen to unite the valve pad to the wall of the tube.

CHARLES EDGAR MAYNARD.